(12) United States Patent
Damsgaard (10) Patent No.: US 11,498,816 B2
(45) Date of Patent: Nov. 15, 2022

(54) METHOD FOR LOADING EQUIPMENT AND/OR PERSONNEL ONTO A WIND TURBINE PLATFORM

(71) Applicant: Seasight Davits ApS, Hvide Sand (DK)

(72) Inventor: Jimmy Staal Damsgaard, Aarslev (DK)

(73) Assignee: Seasight Davits ApS, Hvide Sand (DK)

( * ) Notice: Subject to any disclaimer, the term of this patent is extended or adjusted under 35 U.S.C. 154(b) by 256 days.

(21) Appl. No.: 16/604,464

(22) PCT Filed: Jan. 18, 2019

(86) PCT No.: PCT/EP2019/051243
§ 371 (c)(1),
(2) Date: Oct. 10, 2019

(87) PCT Pub. No.: WO2019/145226
PCT Pub. Date: Aug. 1, 2019

(65) Prior Publication Data
US 2020/0346903 A1    Nov. 5, 2020

(30) Foreign Application Priority Data

Jan. 23, 2018 (EP) .................................... 18153038

(51) Int. Cl.
| | | |
|---|---|---|
| *B66C 23/00* | (2006.01) | |
| *B66C 23/20* | (2006.01) | |
| *F03D 13/25* | (2016.01) | |
| *F03D 13/40* | (2016.01) | |
| *B63B 27/10* | (2006.01) | |
| *B66C 13/40* | (2006.01) | |

(Continued)

(52) U.S. Cl.
CPC ............ *B66C 23/207* (2013.01); *B63B 27/10* (2013.01); *B66C 13/18* (2013.01); *B66C 13/40* (2013.01); *F03D 13/25* (2016.05); *F03D 13/40* (2016.05); *B61G 1/28* (2013.01); *F05B 2230/61* (2013.01); *G01L 1/22* (2013.01); *H04W 88/06* (2013.01)

(58) Field of Classification Search
CPC ......... B66C 1/0256; B66C 1/108; B66C 1/26; B66C 1/66; B66C 13/22; B66C 13/44; B66C 13/48; B66C 23/207; B63B 27/10; F03D 13/25; F03D 13/40; F05B 2230/6102
See application file for complete search history.

(56) References Cited

FOREIGN PATENT DOCUMENTS

| | | | | |
|---|---|---|---|---|
| CA | 2849463 A1 | * | 7/2014 | ............. B63B 23/28 |
| DE | 10 2012 002720 | | 8/2013 | |

(Continued)

OTHER PUBLICATIONS

International Search Report from PCT/EP2019/051243, dated Mar. 28, 2019.

*Primary Examiner* — Emmanuel M Marcelo
(74) *Attorney, Agent, or Firm* — Morse, Barnes-Brown & Pendleton, P.C.; Sean D. Detweiler, Esq.; James M. McKenzie, Esq.

(57) ABSTRACT

A method for loading equipment and/or personnel onto a platform mounted on the nacelle tower of an offshore wind farm is provided. This method enables loading of equipment onto a platform mounted on the nacelle tower or on the monopile or tripod or jacket foundation of an offshore wind turbine without needing to mount the construction during the loading operation.

22 Claims, 6 Drawing Sheets

(51) Int. Cl.
*B66C 13/18* (2006.01)
*G01L 1/22* (2006.01)
*H04W 88/06* (2009.01)
*B61G 1/28* (2006.01)

(56) References Cited

FOREIGN PATENT DOCUMENTS

| | | | | |
|---|---|---|---|---|
| EP | 2 551 233 | 1/2013 | | |
| EP | 3514100 A1 * | 7/2019 | ............. | B63B 27/10 |
| WO | WO-2011145655 A1 * | 11/2011 | ............. | B63B 27/10 |
| WO | WO 2014/168487 | 10/2014 | | |

* cited by examiner

METHOD FOR LOADING EQUIPMENT AND/OR PERSONNEL ONTO A WIND TURBINE PLATFORM

RELATED APPLICATIONS

This application is a national stage filing under 35 U.S.C. 371 of International Application No. PCT/EP2019/051243, filed Jan. 18, 2019, which claims priority to European Application No. 18153038.7, filed Jan. 23, 0218. The entire teachings of said applications are incorporated by reference herein.

TECHNICAL FIELD OF THE INVENTION

The present invention relates to the building process and servicing of offshore wind farms.

BACKGROUND OF THE INVENTION

An offshore wind farm usually comprises a cluster of some hundreds wind turbines. The large number is necessary to be able to efficiently transfer the generated electricity from the wind farm to the shore. There is a substantial need for handling gods in the construction face of an offshore wind farm. In that period the constructors need to have flexible options to handle gods from the vessels to the different turbine platforms with a minimum of working force. Furthermore, a rather intense maintenance of the offshore wind turbines is necessary. Otherwise one or more of the turbines are likely to break down, which results in the wind farm no longer being able to yield a profitable return on investment. With present wind farms, it has become widespread practice to visit each turbine once, sometimes twice a month for inspection and preventive maintenance. From time to time periodic actions need to be taken, like changing the oil in the gear box of the electrical generator or replacing some critical moving parts. In the case of defects, repairs need to be carried out.

For this visitation of the turbines, the service engineers, together with their tools and spare parts, are delivered to the turbines by small shuttle vessels. The service engineers access the turbine via a latter onto an access platform mounted on the nacelle tower or on the monopile/tripod/jacket foundation. In order to board heavy equipment and spare parts, one or more cranes/davits are mounted on this access platform. To operate the cranes/davits, an operator needs to board the access platform first. However, rough sea may prevent the operator from boarding, and the hole operation may need to be canceled.

It is therefore desirable to provide a solution, which can solve above mentioned problems.

DETAILED DESCRIPTION OF THE INVENTION

One aspect relates to a method for loading equipment and/or personnel onto a platform mounted on the nacelle tower or on the monopile or tripod or jacket foundation of an offshore wind turbine, possibly under construction, being part of an offshore wind farm, possibly under construction; the method comprising the steps of:

a) mounting a crane, such as a davit, comprising a beam, and a winch and wire assembly on said platform; the crane being configured for wireless activation and operation;

b) approaching said platform, preferably at a later stage, with a water-borne vessel with equipment and/or personnel for loading onto said platform;

c) wirelessly activating said crane, and wirelessly operating said crane to lower its winch wire end down to the water-borne vessel;

d) directly or indirectly releasably mounting a coupling device to said winch wire end; said coupling device comprising a first part of a coupling mechanism configured to releasably couple the coupling device to a transport container;

e) releasably coupling the coupling device to a transport container adapted for holding equipment and/or personnel and positioned on the water-borne vessel, said transport container comprising a second part of a coupling mechanism configured to releasably couple the coupling device to a transport container; wherein the first and/or second part of said coupling mechanism are configured to decouple from the other part upon receipt of a wireless decoupling signal;

f) wirelessly operating said crane to position said transport container on the platform, and decoupling said coupling device from said transport container by transmitting a wireless decoupling signal;

g) wirelessly operating said crane to lower the coupling device down to the vessel;

optionally repeating steps e) to g) one or more times;

h) decoupling the coupling device from the winch wire end;

i) wirelessly operating said crane to raise its winch wire end; and j) wirelessly deactivating said crane.

In the present context, the term "equipment" covers all types of materials needed in the construction and/or servicing of wind turbines, such as gods, machine parts, and tools.

This method allows for loading of equipment onto a platform mounted on the nacelle tower or on the monopile or tripod or jacket foundation of an offshore wind turbine without needing to mount the construction during the loading operation. If personnel are needed, the present invention allows for a practical and safe positioning of personnel on the platform. The wind turbine may possibly be under construction, and is part of an offshore wind farm, possibly under construction. The equipment may e.g. be used for building a wind turbine or may e.g. be used in the maintenance or servicing of a wind turbine. Hence, using this method, the crew on the crew transfer vessels (CTV) can handle gods from the CTV vessel and back again without needing to have personal on the actual turbine platform located 10-25 meters above the vessel deck. The whole operation can be handled from the vessel deck/wheelhouse on the CTV vessel. The system makes it possible for the CTV vessel to handle gods and/or personnel both night and day making the CTV vessel a more flexible solution for the servicing of the offshore windfarms.

For the method to work, a crane, such as a davit, must have been previously mounted on the wind turbine platform, or alternatively be mounted as the first step. The crane should comprise a beam, and a winch and wire assembly; and should be configured for wireless activation and operation. As the wind turbines are positioned relatively close to one another in a wind farm, there is a substantial risk of activating the wrong crane. Hence, the wireless activation and operation of the crane is preferably performed through an ad hoc communication link, such that the wireless remote-control device, operated by a crew member onboard the water-borne vessel, is paired with the specific crane of interest, and not with a crane positioned on a platform of a neighboring wind turbine.

The next step of the method is approaching the platform with a water-borne vessel, such as a CTV vessel, with equipment and/or personnel for loading onto said platform. When the water-borne vessel is in position, the crane is wirelessly activated, and the crane is then wirelessly operated to lower its winch wire end down to the water-borne vessel. A crew member will then directly (e.g. by coupling to a spelter or swage socket termination of the winch wire end) or indirectly (e.g. via coupling to an attached hook) releasably mount a coupling device to said winch wire end. The coupling device comprises a first part of a coupling mechanism configured to releasably couple the coupling device to a transport container. The coupling device is also configured for releasably coupling or attachment, indirectly or directly, to a winch wire end. A crew member will then releasably couple the coupling device to a transport container adapted for holding equipment and/or personnel and positioned on the vessel. The transport container comprises a second part of a coupling mechanism configured to releasably couple the coupling device to a transport container. The first and/or second part of the coupling mechanism are configured to decouple from the other part upon receipt of a wireless decoupling signal. A crew member onboard the vessel will then wirelessly operate the crane, with a wireless remote-control device, to position said transport container on the platform, and subsequently decouple the coupling device from the transport container by transmitting a wireless decoupling signal. The wireless decoupling signal may be transmitted by a different wireless remote-control device than the one used for the wireless activation and operation of the crane, e.g. to avoid accidental decoupling.

After the decoupling of the coupling device from the transport container, a crew member onboard the vessel will wirelessly be operating the crane to lower the coupling device down to the vessel. Another transport container may then be coupled thereto, or if the work is done, the coupling device will be decoupled from the winch wire end. Finally, a crew member onboard the vessel will wirelessly be operating the crane to raise its winch wire end; and wirelessly deactivate the crane.

In the present context, the term "wire" is intended to be understood in the broadest sense, and include cable, wire cable, chain, rope and wire rope.

In one or more embodiments, the wireless activation of the crane is performed with a unique activation signal, such as a unique wireless frequency or code.

Wireless signals can be transmitted to the crane responder or transponder and/or coupling device responder or transponder using any suitable device, including but not limited to remote-control transponders or transmitters and/or mobile computing device applications. In some embodiments, a remote-control transponder or mobile computing device application may be set to transmit unique signals having a frequency or code assigned to the crane and/or coupling device responder of interest.

The wireless frequency or code may be transmitted using cellular, Wi-Fi, Bluetooth, ZigBee, ultra-high frequency (UHF), or near-field communication (NFC) technology.

Davit cranes are perfect for permanent or portable power. These cranes consist of an angled beam which pivots over a vertical axis. They can have fixed or adjustable booms/beams, and are available in portable as well as stationary units. Davit cranes suitable for the present invention incorporate an electronic winch and wire assembly for load handling.

In one or more embodiments, the crane winch and wire assembly comprises a motor and/or gear unit.

In one or more embodiments, the crane winch and wire assembly comprises a motor and/or a gear.

Wireless communication devices are capable of communication with other devices via wireless communication links. Examples of wireless communication links include cellular communication links and ad hoc communication links. Generally, cellular communication links communicate through network infrastructure and utilize wireless communication protocols such as AMPS, CDMA, TDMA, GSM, iDEN, GPRS, EDGE, UMTS, WCDMA, CDMA2000, and their variants. Ad hoc communication links, on the other hand, communicate peer-to-peer and utilize wireless communication protocols such as HomeRF, Bluetooth, IEEE 802.11, IEEE 802.16, infrared technology, and the like. Ad hoc communication links require some sort of pairing between devices in which the devices discover each other and network addresses of the devices are exchanged in a secure manner. For existing systems, pairing of wireless communication devices for ad hoc communication, such as a Bluetooth connection, requires one device to be discoverable and another device to search the discoverable device. It is necessary for the two devices to be in proximity of each other, and act in tandem.

In one or more embodiments, the wireless activation and operation of the crane is performed through an ad hoc communication link.

In one or more embodiments, the wireless decoupling of the coupling device from the transport container is performed through an ad hoc communication link, preferably a link that is different from the ad hoc communication link used for the wireless activation and operation of the crane.

In one or more embodiments, the wireless activation and operation of the crane is performed through a first ad hoc communication link; and wherein the wireless decoupling of the coupling device from the transport container is performed through a second ad hoc communication link, and wherein the first and second ad hoc communication links are different from one another.

In one or more embodiments, wherein when the ad hoc communication link is lost during a loading operation of the crane, where the coupling device is coupled to a transport container, the crane is configured to automatically position said transport container on the platform at a pre-set position, preferably reserved for such a situation.

In one or more embodiments, the wireless operation of the crane is limited to only lower the transport container onto pre-set positions at the platform.

In one or more embodiments, the wireless operation of the crane is limited only to lower the transport container onto pre-set positions at the platform, and wherein the wireless decoupling of the coupling device from the transport container is limited to execute only when the crane beam is positioned next to such a pre-set position, and when a load cell of the crane senses a weight below a pre-set threshold.

In one or more embodiments, the wireless decoupling of the coupling device from the transport container is limited to execute only when a load cell of the crane senses a weight below a pre-set threshold.

In one or more embodiments, the wireless operation of the crane is guided by a camera, optionally with night vision, mounted on said crane.

The method may, of course, also be used for the reverse situation, where used transport containers are removed from the platform, and placed on the water-borne vessel.

A suitable example of a coupling device comprises a first part of a coupling mechanism configured to releasably couple the coupling device to a transport container. The first part may be configured with a receiving groove adapted for receiving a tapered male component of the second part of the coupling mechanism attached to a transport container. The first part may also comprise fastening means adapted for being positioned in a forwarded position extending into the receiving groove, and in a retracted position away from the receiving groove. The fastening means are configured, in its forwarded position, to releasably engage with the tapered male component of the second part of the coupling mechanism attached to a transport container. The fastening means may, in its forwarded position, be configured as a male component adapted for releasably engagement with a female component formed into the root part of the tapered male component of the second part of the coupling mechanism. The female component may be configured as a circular receiving groove. In a similar manner, the first part may be configured as the tapered male component described above, and the second part may be configured with a receiving groove as described above.

A second aspect relates to a transport system for use in the method according to the present invention; the transport system comprising:
  a coupling device adapted for being coupled to a winch wire end and/or to a crane hook, and comprising a first part of a coupling mechanism configured to releasably couple the coupling device to a transport container;
  a transport container comprising a second part of a coupling mechanism configured to releasably couple the transport container to said coupling device; wherein the first and/or second part of said coupling mechanism are configured to decouple from the other part upon receipt of a wireless decoupling signal; and
  a wireless communication device configured to transmit a wireless decoupling signal.

In one or more embodiments, the first part of a coupling mechanism comprises a first female or male component, the first female component configured to removably receive a first male component of the second part of said coupling mechanism; and wherein the second part of a coupling mechanism comprises a first female or male component, the first female component configured to removably receive a first male component of the second part of said coupling mechanism.

In one or more embodiments, the first male component is tapered; and wherein the first female component is configured with a receiving groove adapted for receiving the first male component, and wherein the first female component comprises locking means adapted for being positioned in a forwarded position extending into the receiving groove, and in a retracted position away from the receiving groove; wherein the locking means is configured for releasably engagement with said first male component.

In one or more embodiments, the first male component is tapered, and with a locking groove formed in the root part of the first male component; and wherein the first female component is configured with a receiving groove adapted for receiving the first male component, and wherein the first female component comprises a lock member adapted for being positioned in a forwarded position extending into the receiving groove, and in a retracted position away from the receiving groove; wherein the lock member is configured for releasably engagement with said locking groove.

In one or more embodiments, the locking groove extends circularly around the root part of the first male component.

A third aspect relates to a transport system comprising:
  a coupling device adapted for being coupled to a winch wire end and/or to a crane hook, and comprising a first part of a coupling mechanism configured to releasably couple the coupling device to a transport container;
  a transport container comprising a second part of a coupling mechanism configured to releasably couple the transport container to said coupling device; wherein the first and/or second part of said coupling mechanism are configured to decouple from the other part upon receipt of a wireless decoupling signal; and
  a wireless communication device configured to transmit a wireless decoupling signal.

A fourth aspect relates to a nacelle tower mounted on a monopile or tripod or jacket foundation of an offshore wind turbine, the nacelle tower comprising a platform; wherein said platform comprises a crane, such as a davit, comprising:
  a beam;
  a winch and wire assembly with a winch wire end;
  a transport container adapted for holding equipment and/or personnel; and
  a coupling device;
  wherein said winch wire end is releasably connected to said coupling device; wherein said coupling device comprises a first part of a coupling mechanism configured to releasably couple the coupling device to said transport container; wherein said transport container comprises a second part of said coupling mechanism configured to releasably couple the coupling device to said transport container; wherein the first and/or second part of said coupling mechanism are configured to decouple from the other part upon receipt of a wireless decoupling signal;
  wherein said crane is configured for wireless activation and operation.

In one or more embodiments, the crane is configured for wireless activation and operation through an ad hoc communication link.

In one or more embodiments, the coupling device is configured for wireless decoupling from the transport container through an ad hoc communication link.

In one or more embodiments, the crane is configured for wireless activation and operation through a first ad hoc communication link; wherein the coupling device is configured for wireless decoupling from the transport container through a second ad hoc communication link; and wherein the first and second ad hoc communication links are different from one another.

In one or more embodiments, wherein when the ad hoc communication link is lost during a loading operation of the crane, where the coupling device is coupled to a transport container, the crane is configured to automatically position said transport container on the platform at a pre-set position, preferably reserved for such a situation.

In one or more embodiments, the crane is configured to only lower the transport container onto pre-set positions at the platform.

In one or more embodiments, the crane is configured to only lower the transport container onto pre-set positions at the platform, and wherein the coupling device is configured to only decouple from the transport container when the crane beam is positioned next to such a pre-set position, and when a load cell of the crane senses a weight below a pre-set threshold.

In one or more embodiments, the coupling device is configured to only decouple from the transport container when a load cell of the crane senses a weight below a pre-set threshold.

In one or more embodiments, the first part of the coupling mechanism comprises a first female or male component, the first female component configured to removably receive a first male component of the second part of said coupling mechanism; and wherein the second part of a coupling mechanism comprises a first female or male component, the first female component configured to removably receive a first male component of the second part of said coupling mechanism.

In one or more embodiments, the first male component is tapered; and wherein the first female component is configured with a receiving groove adapted for receiving the first male component, and wherein the first female component comprises locking means adapted for being positioned in a forwarded position extending into the receiving groove, and in a retracted position away from the receiving groove; wherein the locking means is configured for releasably engagement with said first male component.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED DESCRIPTION OF THE FIGURES

Figure 1:
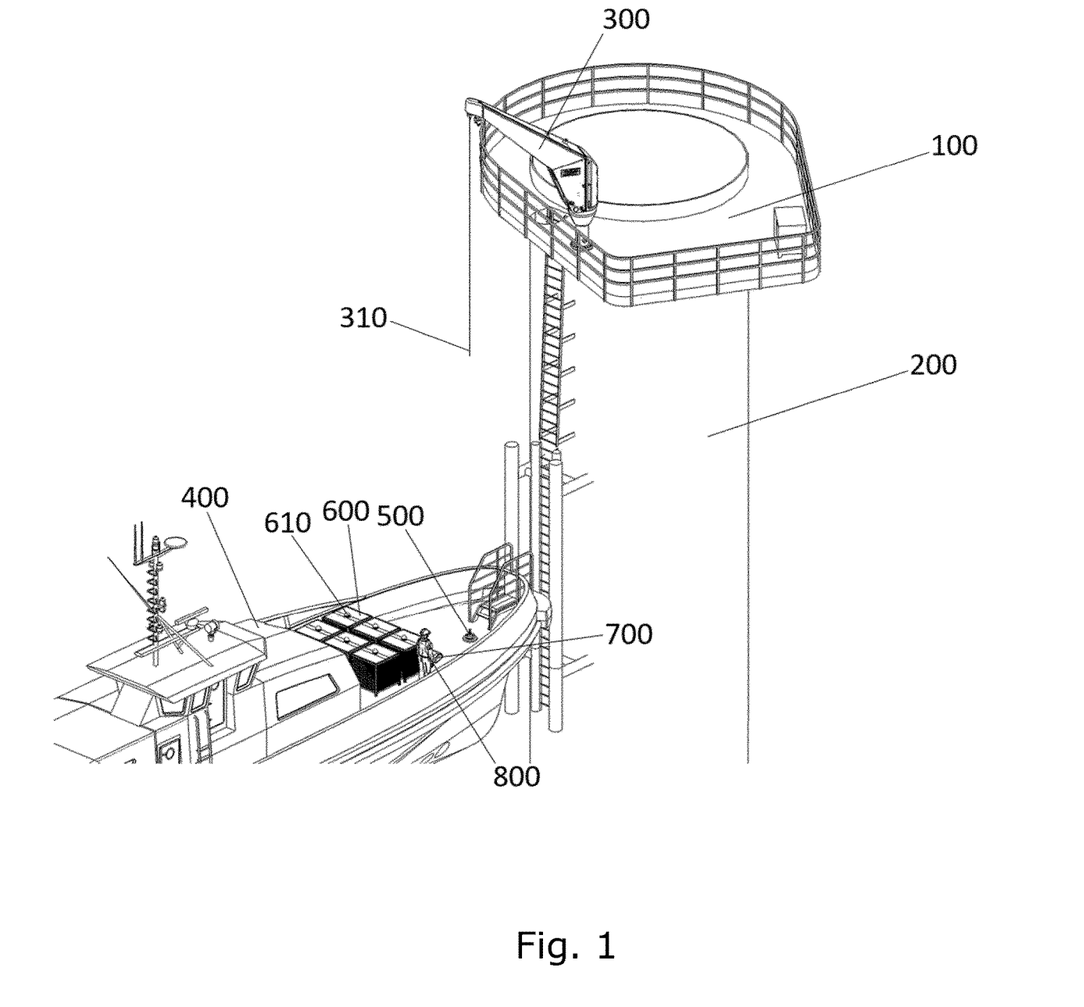
FIGS. 1-5 show still shots of individual method steps in accordance with various embodiments of the invention.

The method of the present invention allows for loading of equipment onto a platform mounted on the nacelle tower or on the monopile or tripod or jacket foundation of an offshore wind turbine without needing to mount the construction during the loading operation. In the following, the principle of the method is exemplified in FIGS. 1-5 with a wind turbine under construction. FIG. 1 shows a water-borne vessel 400 in position in front of a nacelle tower 200. A crane (davit) 300 has previously been mounted on the platform 100. The crane 300 comprises a beam, and a winch and wire assembly (not specified in the drawing); and is configured for wireless activation and operation. The crane 300 has been wirelessly activated by a crew member 800 holding a wireless communication device 700, and the crane is wirelessly operated to lower its winch wire end 310 down to the vessel 400. A coupling device 500 is positioned on the deck. The coupling device 500 comprises a first part of a coupling mechanism configured to releasably couple the coupling device 500 to a transport container 600. The transport container 600 comprises a second part 610 of a coupling mechanism configured to releasably couple the coupling device to a transport container. The first and/or second 610 part of the coupling mechanism are configured to decouple from the other part upon receipt of a wireless decoupling signal.

Figure 2:
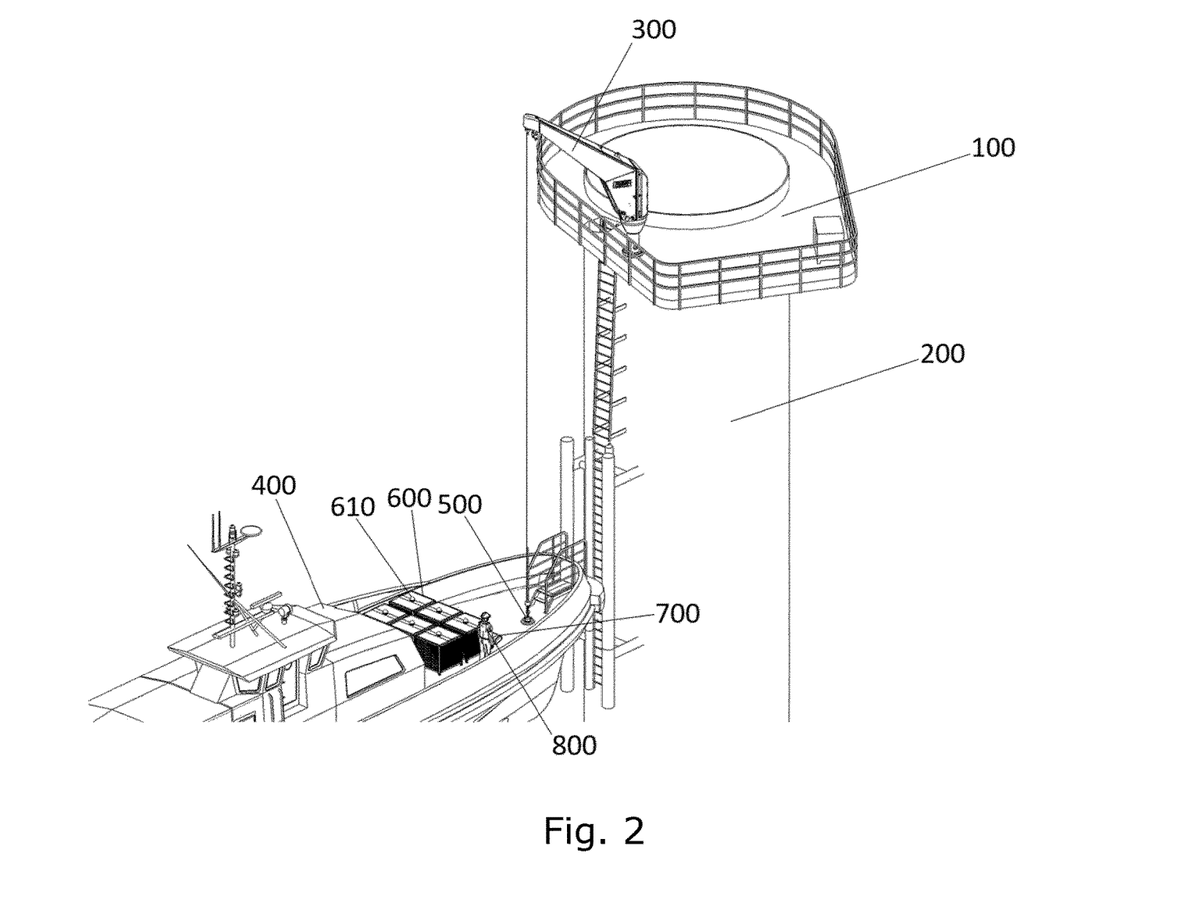
Figure 3:
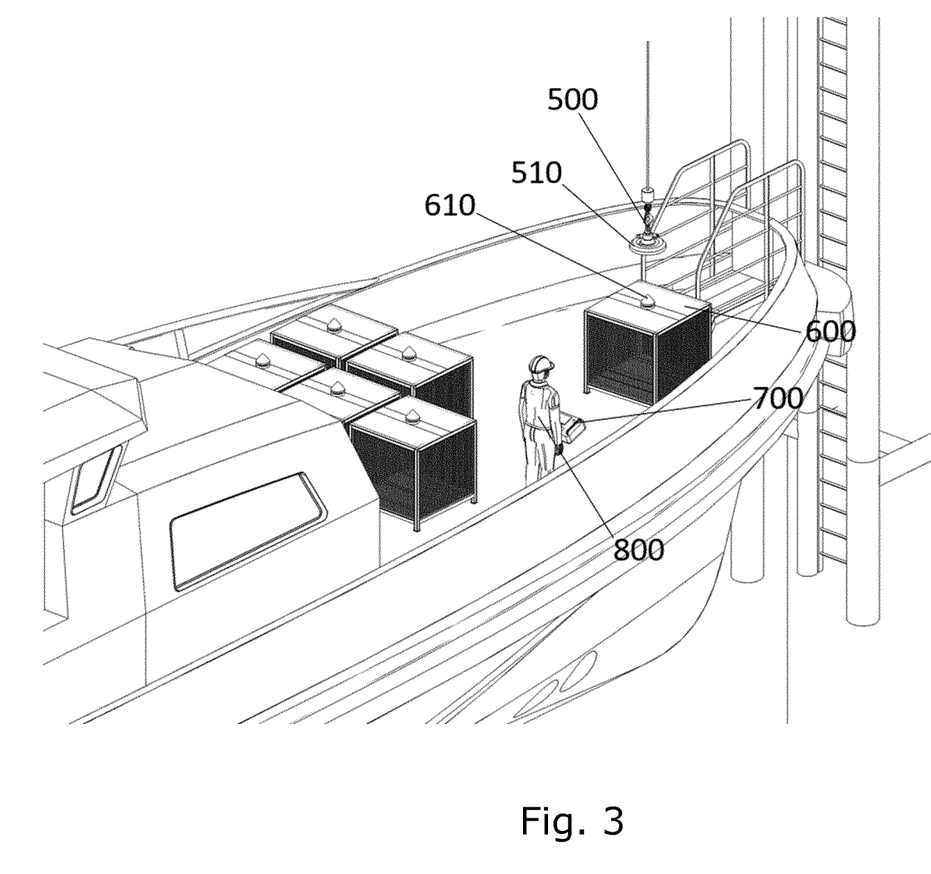
Figure 4:
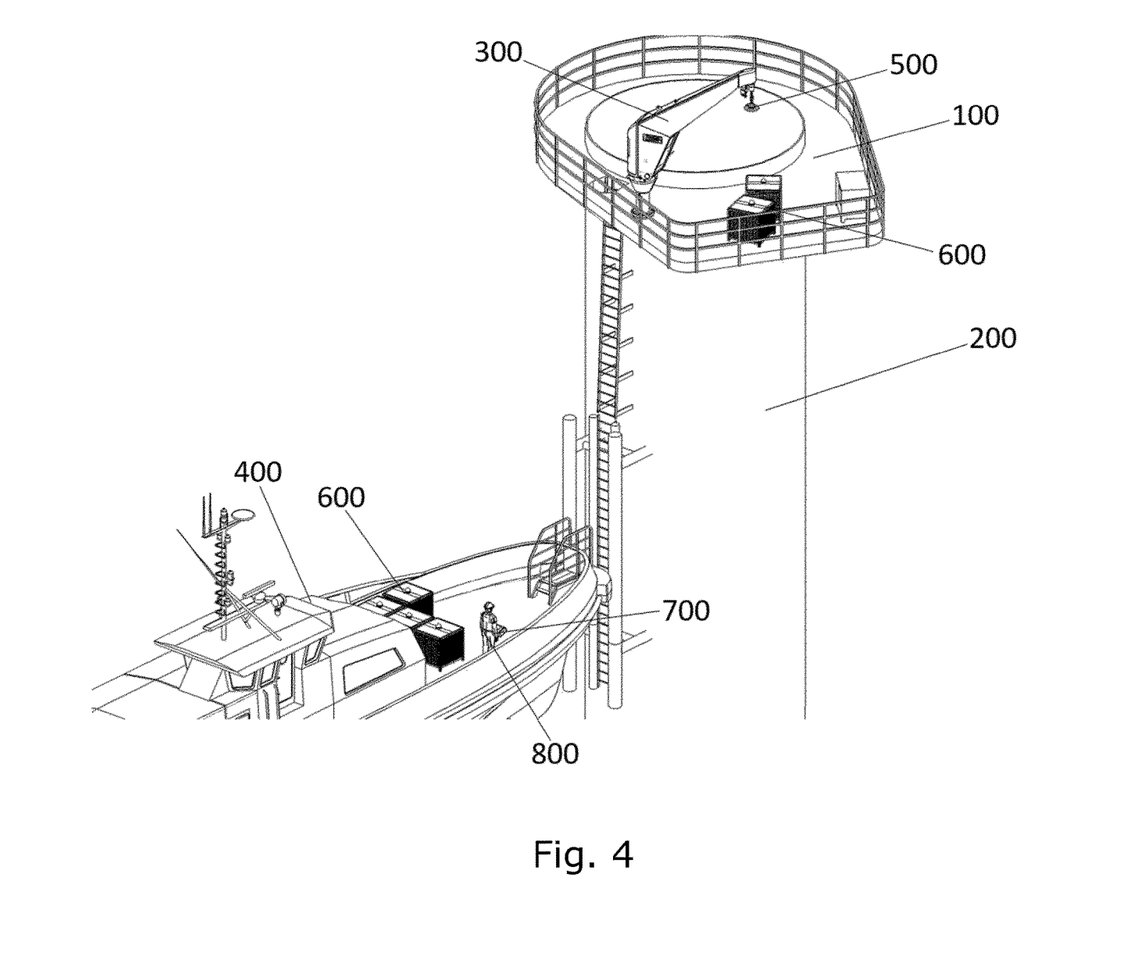

In FIG. 2, the crew member 800 has already releasably mounted the coupling device 500 to said winch wire end 310. In FIG. 3, the crew member 800 has raised the coupling device 500 from the deck and a transport container 600 is moved into position. The first 510 and second 610 parts of the coupling mechanism will then be connected, and the crew member 800 onboard the vessel will then wirelessly operate the crane 300, with the wireless communication device 700, to position said transport container on the platform, and subsequently decouple the coupling device 500 from the transport container 600 by transmitting a wireless decoupling signal. This has just happened in FIG. 4. The wireless decoupling signal may be transmitted by a different wireless communication device 700 than the one used for the wireless activation and operation of the crane, e.g. to avoid accidental decoupling.

Figure 5:
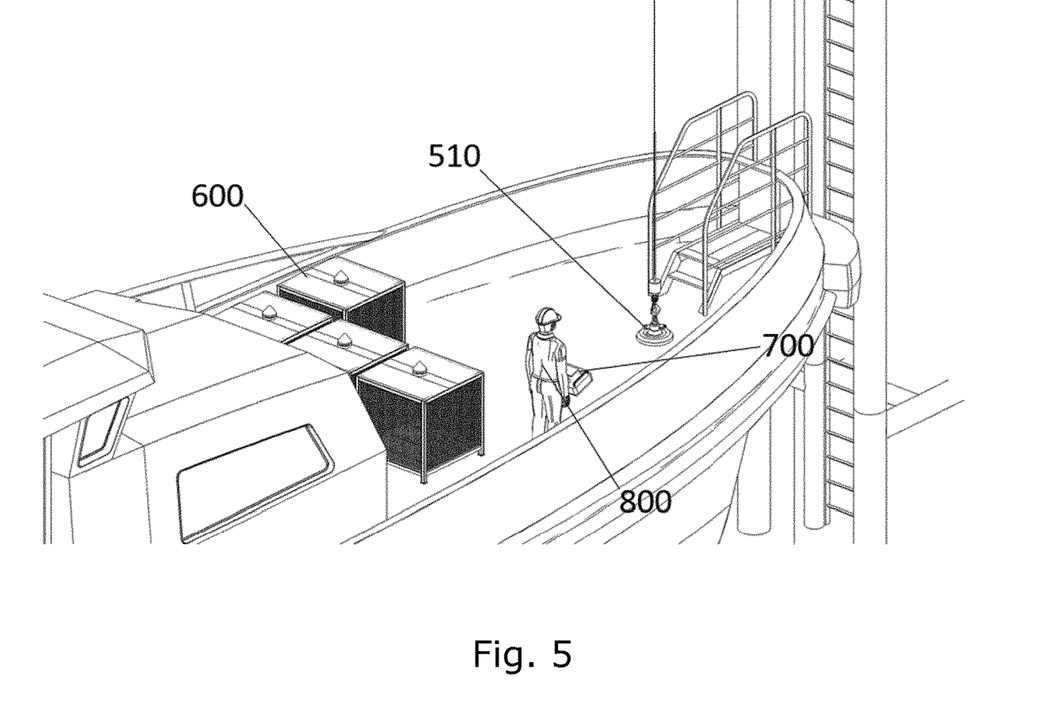

After the decoupling of the coupling device 500 from the transport container 600, a crew member 800 onboard the vessel 400 will wirelessly be operating the crane 300 to lower the coupling device 500 down to the vessel 400 (FIG. 5). Another transport container may then be coupled thereto, or if the work is done, the coupling device will be decoupled from the winch wire end. Finally, a crew member onboard the vessel will wirelessly be operating the crane to raise its winch wire end; and wirelessly deactivate the crane.

Figure 6:
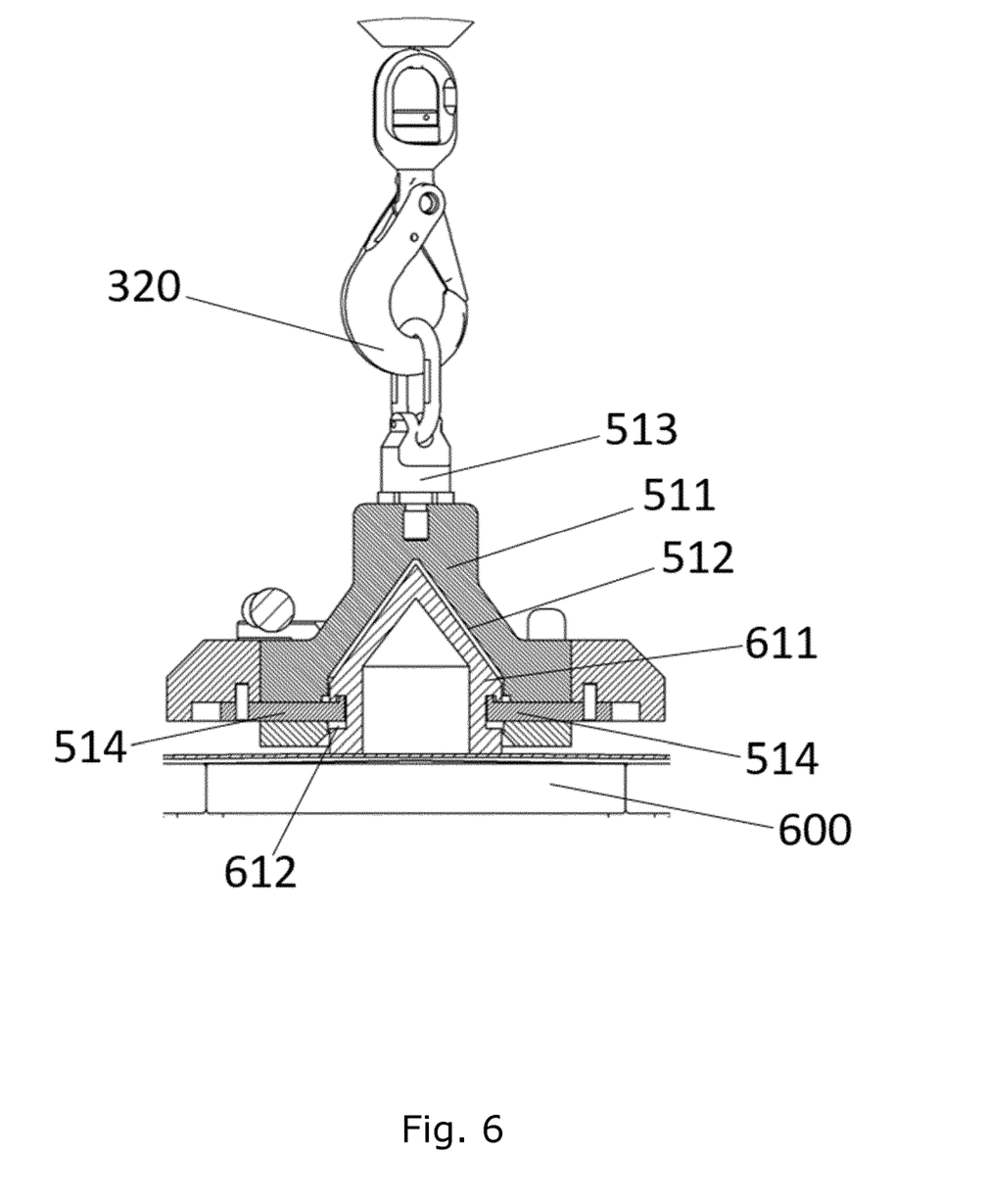
FIG. 6 shows a coupling device in accordance with various embodiments of the invention.

An exemplary coupling device 500 is shown in FIG. 6 (cross-sectional view), where it is coupled to a transport container 600 (only the top part of the transport container is shown). The coupling device 500 is shown being coupled to a crane hook 320 via a hoist ring 513, and comprises a first part of a coupling mechanism configured to releasably couple the coupling device 500 to a transport container 600. The transport container 600 comprises a second part of a coupling mechanism configured to releasably couple the transport container 600 to said coupling device 500. The first part of the coupling mechanism is configured to decouple from the second part upon receipt of a wireless decoupling signal. The first part of the coupling mechanism comprises a first female 511 component, and is configured to removably receive a first male 611 component of the second part of the coupling mechanism. The first male 611 component is tapered; and the first female 511 component is configured with a receiving groove 512 adapted for receiving the first male 611 component. The first male 611 component comprises a locking groove 612 formed in the root part. The first female 511 component comprises a lock member 514 adapted for being positioned in a forwarded position extending into the locking groove 612, and in a retracted position away from the locking groove 612. The lock member 514 is configured for releasably engagement with said locking groove 612. The locking groove 612 extends circularly around the root part of the first male 611 component.

REFERENCES

100 Platform
200 Tower
300 Crane
310 Winch wire end
400 Water-borne vessel

500 Coupling device
510 First part of a coupling mechanism
511 First female component
512 Receiving groove
513 Hoist ring
514 Locking means/Lock member
600 Transport container
610 Second part of a coupling mechanism
611 First male component
612 Locking groove
700 Wireless communication device
800 Crew member

The invention claimed is:

1. A method for loading equipment onto a platform mounted on a nacelle tower or on a monopile or tripod or jacket foundation of an offshore wind turbine, the method comprising the steps of:
  a) mounting a crane comprising a beam, and a winch and wire assembly on said platform; the crane being configured for wireless activation and operation;
  b) approaching said platform with a water-borne vessel with equipment and/or personnel for loading onto said platform;
  c) wirelessly activating said crane, and wirelessly operating said crane to lower its winch wire end down to the water-borne vessel;
  d) directly or indirectly releasably mounting a coupling device to said winch wire end; said coupling device comprising a first part of a coupling mechanism configured to releasably couple the coupling device to a transport container;
  e) releasably coupling the coupling device to the transport container adapted for holding equipment and/or personnel and positioned on the water-borne vessel, said transport container comprising a second part of the coupling mechanism configured to releasably couple the coupling device to the transport container; wherein the first and/or second part of said coupling mechanism are configured to decouple from the other part upon receipt of a wireless decoupling signal;
  f) wirelessly operating said crane to position said transport container on the platform, and decoupling said coupling device from said transport container by transmitting a wireless decoupling signal;
  g) wirelessly operating said crane to lower the coupling device down to the water-borne vessel;
  optionally repeating steps e) to g) one or more times;
  h) decoupling the coupling device from the winch wire end;
  i) wirelessly operating said crane to raise its winch wire end; and
  j) wirelessly deactivating said crane.

2. The method according to claim 1, wherein the wireless activation and operation of the crane is performed through an ad hoc communication link.

3. The method according to claim 2, wherein when the ad hoc communication link is lost during a loading operation of the crane, where the coupling device is coupled to a transport container, the crane is configured to automatically position said transport container on the platform at a pre-set position.

4. The method according to claim 1, wherein the wireless decoupling of the coupling device from the transport container is performed through an ad hoc communication link.

5. The method according to claim 1, wherein the wireless activation and operation of the crane is performed through a first ad hoc communication link; and wherein the wireless decoupling of the coupling device from the transport container is performed through a second ad hoc communication link, and wherein the first and second ad hoc communication links are different from one another.

6. The method according to claim 1, wherein the wireless activation of the crane is performed with a unique activation signal.

7. The method according to claim 1, wherein the wireless operation of the crane is limited to only lower the transport container onto pre-set positions at the platform.

8. The method according to claim 1, wherein the wireless operation of the crane is limited to only lower the transport container onto pre-set positions at the platform, and wherein the wireless decoupling of the coupling device from the transport container is limited to execute only when the crane beam is positioned next to such a pre-set position, and when a load cell of the crane senses a weight below a pre-set threshold.

9. The method according to claim 1, wherein the wireless decoupling of the coupling device from the transport container is limited to execute only when a load cell of the crane senses a weight below a pre-set threshold.

10. The method according to claim 1, wherein the wireless operation of the crane is guided by a camera mounted on said crane.

11. A nacelle tower mounted on a monopile or tripod or jacket foundation of an offshore wind turbine, the nacelle tower comprising a platform; said platform comprises a crane comprising:
  a beam;
  a winch and wire assembly with a winch wire end;
  a transport container adapted for holding equipment and/or personnel; and
  a coupling device;
  wherein said winch wire end is releasably connected to said coupling device;
  wherein said coupling device comprises a first part of a coupling mechanism configured to releasably couple the coupling device to said transport container;
  wherein said transport container comprises a second part of said coupling mechanism configured to releasably couple the coupling device to said transport container;
  wherein the first and/or second part of said coupling mechanism are configured to decouple from the other part upon receipt of a wireless decoupling signal;
  wherein said crane is configured for wireless activation and operation.

12. The nacelle tower according to claim 11, wherein the crane is configured for wireless activation and operation through an ad hoc communication link.

13. The nacelle tower according to claim 12, wherein when the ad hoc communication link is lost during a loading operation of the crane, where the coupling device is coupled to the transport container, the crane is configured to automatically position said transport container on the platform at a pre-set position.

14. The nacelle tower according to claim 11, wherein the coupling device is configured for wireless decoupling from the transport container through an ad hoc communication link.

15. The nacelle tower according to claim 11, wherein the crane is configured for wireless activation and operation through a first ad hoc communication link; wherein the coupling device is configured for wireless decoupling from the transport container through a second ad hoc communication link; and wherein the first and second ad hoc communication links are different from one another.

16. The nacelle tower according to claim 11, wherein the crane is configured to only lower the transport container onto pre-set positions at the platform.

17. The nacelle tower according to claim 11, wherein the crane is configured to only lower the transport container onto pre-set positions at the platform, and wherein the coupling device is configured to only decouple from the transport container when the crane beam is positioned next to such a pre-set position, and when a load cell of the crane senses a weight below a pre-set threshold.

18. The nacelle tower according to claim 11, wherein the coupling device is configured to only decouple from the transport container when a load cell of the crane senses a weight below a pre-set threshold.

19. The nacelle tower according to claim 11, wherein the first part of the coupling mechanism comprises a first female or male component, the first female component configured to removably receive a first male component of the second part of said coupling mechanism; and wherein the second part of the coupling mechanism comprises a first female or male component, the first female component configured to removably receive the first male component of the second part of said coupling mechanism.

20. The nacelle tower according to claim 19, wherein the first male component is tapered; and wherein the first female component is configured with a receiving groove adapted for receiving the first male component, and wherein the first female component comprises locking means adapted for being positioned in a forwarded position extending into the receiving groove, and in a retracted position away from the receiving groove; wherein the locking means is configured for releasably engagement with said first male component.

21. The nacelle tower according to claim 19, wherein the first male component is tapered, and with a locking groove formed in a root part of the first male component; and wherein the first female component is configured with a receiving groove adapted for receiving the first male component, and wherein the first female component comprises a lock member adapted for being positioned in a forwarded position extending into the locking groove, and in a retracted position away from the locking groove; wherein the lock member is configured for releasably engagement with said locking groove.

22. The nacelle tower according to claim 21, wherein the locking groove extends circularly around the root part of the first male component.

* * * * *